Sept. 15, 1931.   W. V. N. POWELSON ET AL   1,823,289
HOUSING EQUIPMENT FOR AIRCRAFT
Original Filed Sept. 21, 1921   2 Sheets-Sheet 2
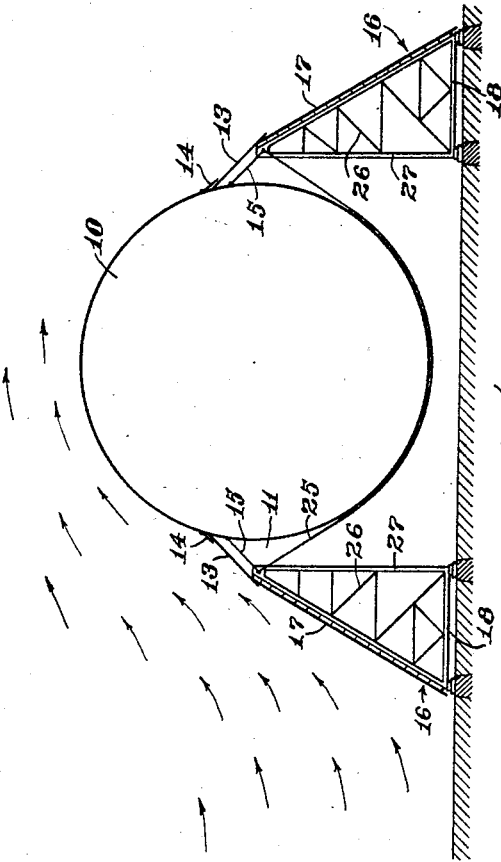
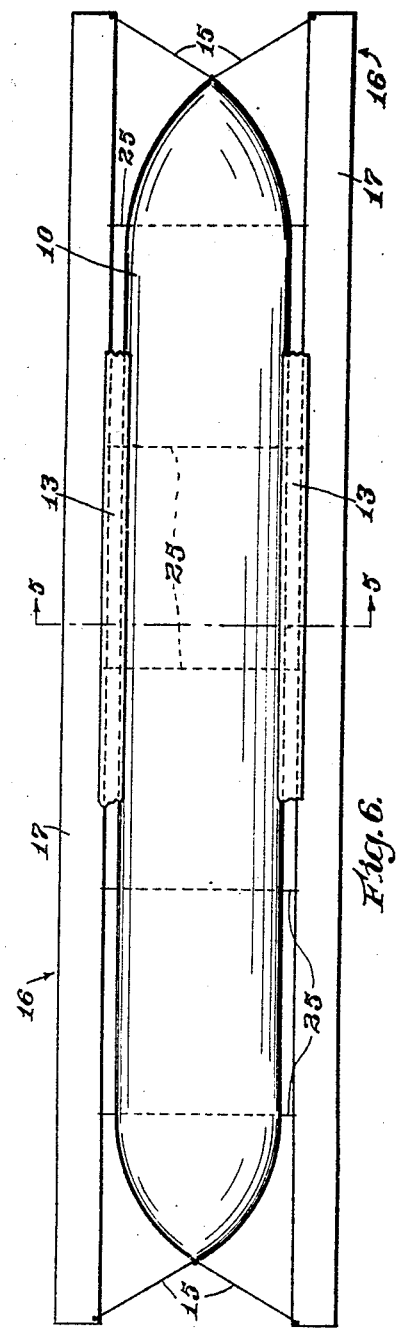
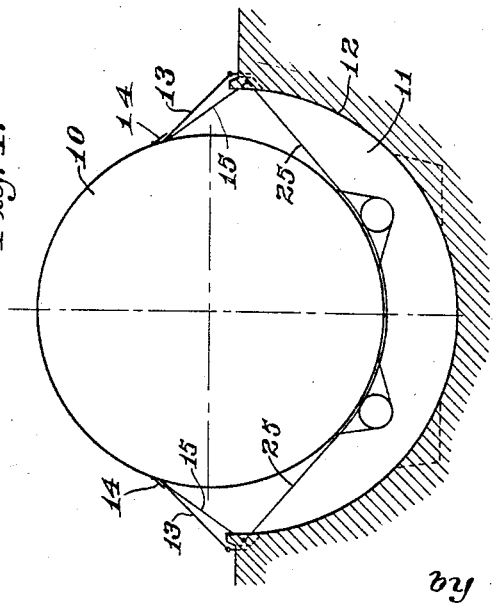
Inventors
Wilfrid V. N. Powelson
Warren Travell
by Mitchell Chadwick & Kent
Attorneys Patented Sept. 15, 1931

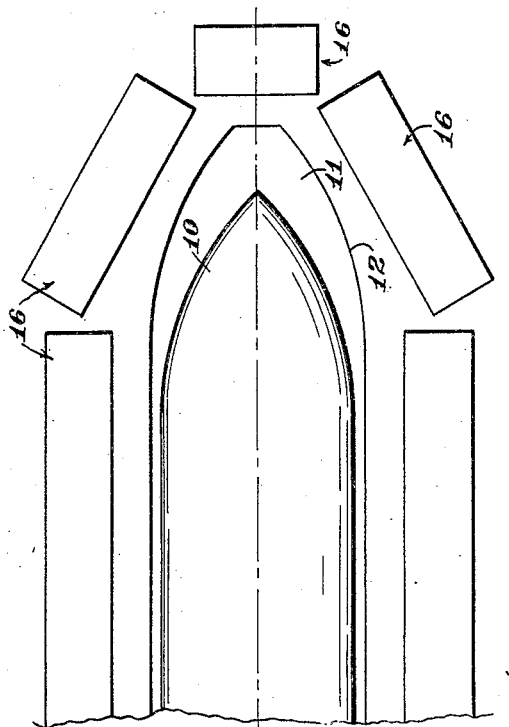
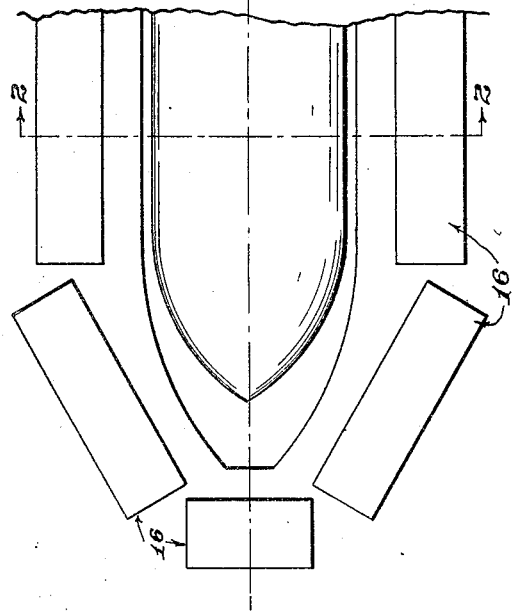
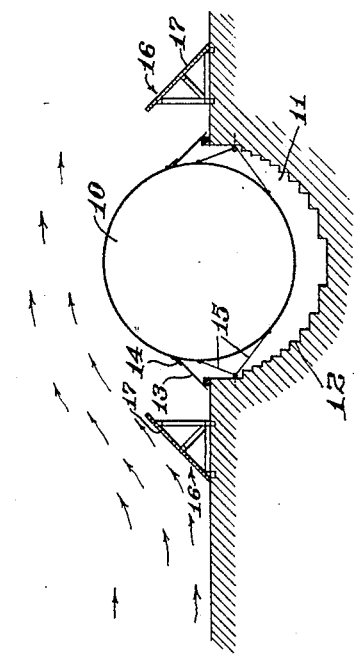

1,823,289

UNITED STATES PATENT OFFICE

WILFRID V. N. POWELSON, OF NEW YORK, N. Y., AND WARREN TRAVELL, OF SAN BERNARDINO, CALIFORNIA

HOUSING EQUIPMENT FOR AIRCRAFT

Original application filed September 21, 1921, Serial No. 502,127. Divided and this application filed November 25, 1930. Serial No. 499,728.

This invention pertains to housing equipment for aircraft. More particularly, it pertains to equipment providing simple and inexpensive facilities for housing lighter-than-air ships. It provides means whereby airships of the largest proportions can be safely sheltered from the elements without resorting to the use of enclosed buildings, known as hangars, and like structures whose necessarily great size involves important expense and risk for construction and maintenance.

The devices of the invention are especially available for housing airships at ports of call, as distinguished from stations, because their relatively low cost of construction and their small annual depreciation make it financially possible for shelter facilities to be provided where otherwise the cost of shelter would be prohibitive and where the mere providing of a mooring mast would be inadequate provision for reliable service. Masts are open to the very important objections that even while moored thereto an airship may be subjected to considerable stress by wind conditions, by snow, sleet and ice, or by the sun's heat, to other burdens and dangers, and to interference with regular operation.

The present invention provides simple housing and protecting means, inexpensive in cost, in which the airship may be kept for such period as may be desired. Briefly stated, it resides in the provision of one or more wind deflectors, either fixed or portable and either rigid or collapsible, with which is preferably associated a chamber in which the lower part of the airship is received. The chamber may be a hollow or pit, in surface approximating the curviform underside of the airship. By cooperation between such a chamber and the wind deflectors, stresses imposed by high wind are almost entirely eliminated and the airship protected during its stay almost wholly from winds and to a greater or less extent, according to circumstances, from other inclemencies of the weather.

In the accompanying drawings, which are somewhat diagrammatic:

Figure 1 is a plan showing an airship housed in such equipment and protected from the elements by wind deflectors and a chamber of the kind described;

Figure 2 is a cross-section, on line 2—2 of Figure 1, illustrating one type of deflector that may be employed;

Figure 3 is an elevation showing in detail the construction of a wind deflector slightly different in structural type from that of Figure 2, but operating similarly in principle, and which may be considered represented in Figure 1;

Figure 4 is a cross section, corresponding to Figure 2, showing a slightly modified way of securing the airship;

Figure 5 is a cross section, on line 5—5 of Figure 6, showing still a different arrangement of wind deflector with respect to the airship; and Figure 6 is a plan of the housing equipment of Figure 5.

Figures 1 and 2 disclose a preferred embodiment of the housing equipment of the invention. The airship itself, designated 10, is shown as disposed in the generally curviform chamber 11. The latter is shown as an excavated chamber of which the walls 12 may take whatever form is desired. For example, a smooth curve is shown in Figure 4, and a preferred form is more particularly shown in Figure 2, stepped in general curviform fashion. In this instance the relative size of chamber is represented such that the airship can be depressed into the chamber with the mid-horizontal plane of the ship's envelope at the ground level. This protects the under part of the ship completely from winds, and so eliminates all upthrust of wind blowing against the sloping under part of its envelope. Incidentally the upper half of the envelope is brought nearer to ground level, where the wind velocity is less than the wind velocity somewhat higher in air.

The airship may conveniently be held at the desired level by guy ropes 15, of which there may be any suitable number, the same being fixed to the walls 12 of the chamber 11 and also to the airship 10. Extending from the airship to the edge of the chamber 11 are sheeting strips 13 which serve to keep out atmospheric precipitation. Associated with sheets 13 are the flashing strips 14, present for the same purpose. The latter may be secured along the ship's envelope 10, overlying the top edges of the sheets 13.

Somewhat removed from the edge of the chamber 11 are wind deflectors 16, which, sub-divided into convenient lengths, may be distributed around the chamber 11 at ground level. Essentially, these deflectors 16 each have an angularly disposed surface 17 which serves to turn horizontal wind upward and over the airship. The wind deflectors 16 may be of any desired length, and, while shown as collapsible in Figure 3, may, if preferred, be rigid.

In Figure 3 one type of a wind deflector 16 is shown in detail. It comprises, as stated, a sloping surface 17 of any desired material, examples being sail cloth, wood and metal, and includes the base 18 to which, at 22, the surface 17 is pivoted. For retaining surface 17 in proper angular relation to base 18 there is provided a strut 19 which is pivoted at 23 to base 18 and which projects into a pocket 20 on the under side of the surface 17. The angle between surface 17 and base 18 depends upon the location of the pocket 20, which may be placed wherever desired.

In the deflectors shown in Figure 3, sills 21 serve to hold the same to the ground in a given position. Because of the pivoting of members 17 and 19, it is possible to collapse a wind deflector 16 of the type shown in Figure 3 into a low, compact structure which offers no appreciable resistance to a body of men "walking the airship" thereover, so that the ship can be conveniently moved from any direction to a position over the chamber. In this respect the device of the invention is superior to a hangar, heretofore used, which can be approached and entered only from one end,—and the wind conditions may make such an approach difficult.

The construction illustrated has the advantage that when wind or other conditions do not require their use the deflectors on the lee side can be put out of the way, in a manner which is impossible with side walls of a rigid shed. This, with the open top and the upward diversion of air currents on the windward side by means of a structure which need not reach to the very top, gives a large measure of protection and great flexibility in use, at a relatively low cost. For raising collapsed deflectors use may be made of any conventional lifting means.

Figure 4 represents a modification of the arrangement of Figure 2 and shows the airship 10 held in the chamber 11 by means of guy ropes 15 and cradle 25. The latter may be of cloth or of some other material and preferably, but not necessarily, conforms to the shape of the ship. In Figure 4, the chamber is made without enclosing unnecessary space, and so without unnecessary expense for removal of earth. Ordinarily this will give the chamber walls a generally curviform concave aspect, either smooth as in Figure 4 or stepped as in Figure 2. The cradle 25, adapting itself to the shape of the airship 10, also provides a generally curviform chamber in which the airship is received. Strips 13 and 14 prevent access of atmospheric precipitation to the housing chamber or chambers.

In Figure 5 the dirigible 10 is shown as housed above the ground, the lower part of the ship being supported by the cloth or other cradle 25. The cradle 25 provides a generally curviform chamber in which the dirigible 10 is received for housing purposes. Entry of atmospheric precipitation is prevented, as before, by members 13 and 14. Guy ropes 15 hold the dirigible in place.

In Figures 5 and 6 the deflectors 16 are shown as rigid structures permanently mounted. They comprise a wind-deflecting surface 17, a base 18 and re-inforcing truss work 26 and 27. The deflectors 16 serve not only to deflect wind, but also to hold in place the cradle 25 in which the airship is received. In Figure 6, the deflectors 16 are shown extending the entire length of the airship, this form being preferable in some cases.

In each case the sheet strips 13 also constitute wind deflectors. They continue upward the effect of the deflectors which rest on the ground; and it will be observed that in each case the direction into which the wind is deflected is approximately tangential to the adjacent upper part of the envelope, being close at hand in Figures 4 and 5, and parallel to the tangent but at a little distance in Figure 2. The lateral wind pressure on the exposed upper part of the envelope is thus, by the deflector below, reduced to less than it would otherwise be; and such pressure as there is impinges on a surface which is oblique and therefore has a downward component that tends to keep the ship in its berth, especially as this downward component finds no balancing upward component from wind striking the under side of the ship.

By means of the present invention, it is thus possible to provide simple and inexpensive housing equipment for airships, without necessity for a structure covering the entire airship. The airship envelope plays an important part in protecting the housing chamber 11 from precipitation, yet only a minor portion of the envelope's area is exposed to the elements. There results an immense saving in housing cost; and it is possible to protect an airship for long periods of time without elaborate equipment.

In operation, it is feasible to bring the ship to earth in any usual or suitable way, and if not brought directly down into the housing pit or chamber, to "walk" the ship or move it by any desired method to the chamber 11. It is then lowered into place and held suspended as shown in the drawings. Strips 13 and 14 are then put into place; and the wind deflectors, if collapsible, elevated to the desired angle. The order of these steps is reversed when the ship is to be launched for flight, or some may be omitted and the ship let rise directly from the chamber.

The present disclosure is directed to subject matter divided out of application Serial No. 502,127, filed on September 21, 1921, for "Means for mooring and housing airships." It is intended that the patent to mature from this application shall cover, by suitable expression in appended claims, whatever features of patentable novelty reside in the invention herein disclosed.

We claim as our invention:

1. In airship housing equipment, means providing a generally curviform chamber for receiving the lower part of an airship envelope, means extending from the edge of said chamber to the envelope for preventing the entry of atmospheric precipitation, and one or more wind-deflecting surfaces extending obliquely from the ground upward beside the envelope, the shape of said chamber approximating that of the lower part of the airship.

2. In airship housing equipment, means providing a generally curviform chamber for receiving the lower part of an airship envelope, and, beside it, one or more wind-deflecting surfaces extending obliquely from the ground upward beside the envelope, the shape of said chamber approximating that of the lower part of the airship.

3. In airship housing equipment, means providing a pit for receiving the lower part of an airship envelope and one or more wind-deflecting surfaces extending obliquely from the ground upward beside the envelope.

4. In airship housing equipment, means providing a pit for receiving the lower part of an airship envelope, and, associated therewith, a series of collapsible structures having wind-deflecting surfaces extending obliquely from the ground upward beside the envelope.

5. In aircraft housing equipment, a wind deflector comprising a base, a deflecting surface supported thereon, means for setting an angle at which the surface is inclined upward from the base, said means maintaining the set angular relation of the base and the deflecting surface.

6. In aircraft housing equipment, a wind deflector comprising a base, a pivoted deflecting surface extending thence toward the top of the aircraft and means for maintaining the angular relation of the base and the deflecting surface, said wind deflector being capable of collapsing to form a low, compact structure on removal of said maintaining means.

7. In airship housing equipment, cradle-forming means corresponding closely to the shape of the lower part of the airship, and, at the side thereof, a wind-deflector inclined from the ground toward the top of the airship.

8. In airship housing equipment, means forming a fabric cradle for receiving the lower part of an airship, and, at the sides thereof, a wind deflector inclined from the ground toward the top of the airship.

9. In equipment for protecting airships, the combination of an open shelter pit having a length greater than the lengths of the airships to be protected, a width greater than the widths of said airships, and cross-sections homologous to the cross-sections of the lower portions of said airships; and means for holding an airship in such a position that its lower portion is contained within said open shelter pit and protected thereby.

10. In equipment for protecting airships, the combination of a shelter pit of suitable size for containing the lower portion of an airship; a flexible cradle suspended in the pit between the sides thereof; and means for holding said airship in position in said cradle.

11. In equipment for protecting airships, the combination as in claim 9 together with a covering over said pit, comprising the upper part of the airship itself while in said pit, the strips of weather-proof material covering the space between said airship and the edges of the shelter pit.

12. In equipment for protecting airships, the combination of a shelter pit of suitable size for containing the lower portion of an airship and a weather-proof covering over said pit, which covering comprises the upper portion of the airship while in said pit and a strip of weather-proof material extending around the airship and covering the space between said airship and the edges of the shelter pit.

13. In equipment for protecting airships, the combination of a shelter pit of suitable size for containing the lower portion of an airship, a flashing strip of weather-proof material extending along both sides of said airship and other weather-proof material extending from beneath said flashing strip to the edges of the shelter pit, thereby forming with the upper portion of the airship, a protection from the weather for the lower portion of said airship.

14. In equipment for protecting airships, the combination as in claim 13, together with means for holding an airship in such a position that its lower portion is contained within said shelter pit.

15. In equipment for protecting airships, the combination as in claim 9, together with a weather-proof covering over said pit, which covering comprises the upper portion of the airship and a strip of weather-proof material extending around the airship and covering the space between said airship and the edges of the shelter pit.

16. In equipment for protecting airships, the combination as in claim 12, together with planes inclined to the horizontal for deflecting wind from that portion of the airship which projects above the shelter pit.

17. In equipment for protecting airships, the combination of a shelter pit of suitable size for containing the lower portion of an airship and structures located about said pit and having surfaces inclined to the horizontal for deflecting wind from the upper portion of said airship while its lower portion is contained within the shelter pit.

18. In equipment for housing an airship, the combination of two structures spaced a distance apart greater than the width of the airship to be housed, each having an inclined upper surface of a length approximately as great as the length of said airship; a cradle between said structures, adapted for holding an airship; and a covering over said cradle, comprising the upper surface of said airship when in the cradle and strips of weather-proof material covering the space between said airship and said inclined surfaces.

19. In equipment for holding an airship, the combination of a cradle adapted for holding said airship and having weather-proof sides, and a covering over said cradle, comprising the upper surface of said airship when in the cradle, and strips of weather-proof material covering the space between said airship and the sides of the cradle.

20. In equipment for protecting airships, the combination of a shelter pit of suitable size for containing the lower portion of an airship together with tackle extending from the upper portion of the airship to the edges of the pit for holding the airship down and other tackle extending from the lower portion of the airship to the edges of the pit for holding the airship up, thereby providing a secure means for fastening said airship in a position with its lower portion contained within the shelter pit.

Signed at San Bernardino, California, this eleventh day of November, 1930.

WILFRID V. N. POWELSON.
WARREN TRAVELL.